US008593463B2

(12) United States Patent  
Jarrett et al.

(10) Patent No.: US 8,593,463 B2  
(45) Date of Patent: Nov. 26, 2013

(54) CONTROLLING ANIMATION FRAME RATE OF APPLICATIONS

(75) Inventors: Robert Jarrett, Snohomish, WA (US); Sankhyayan Debnath, Seattle, WA (US); Paul Kwiatkowski, Redmond, WA (US); Martyn Lovell, Seattle, WA (US); Billie Sue Chafins, Seattle, WA (US); Paul Gildea, Seattle, WA (US); Jay Turney, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 453 days.

(21) Appl. No.: 12/606,559

(22) Filed: Oct. 27, 2009

(65) Prior Publication Data

US 2011/0096077 A1    Apr. 28, 2011

(51) Int. Cl.  
*G06T 13/00*    (2011.01)

(52) U.S. Cl.  
USPC .......................................................... 345/473

(58) Field of Classification Search  
None  
See application file for complete search history.

(56) References Cited

U.S. PATENT DOCUMENTS

| | | | |
|---|---|---|---|
| 5,621,431 A * | 4/1997 | Harper et al. | 345/473 |
| 7,443,401 B2 | 10/2008 | Blanco et al. | |
| 7,548,237 B2 | 6/2009 | David et al. | |
| 2004/0233201 A1 | 11/2004 | Calkins et al. | |
| 2007/0057952 A1 * | 3/2007 | Swedberg et al. | 345/474 |
| 2008/0034292 A1 | 2/2008 | Brunner et al. | |
| 2009/0167768 A1 * | 7/2009 | Bull et al. | 345/473 |
| 2011/0124375 A1 * | 5/2011 | Stuivenwold | 455/566 |

OTHER PUBLICATIONS

"Using Windows Animation"—Published Date: Jul. 13, 2009 http://msdn.microsoft.com/en-us/library/dd756784(VS.85).aspx.  
"IUIAnimationTimer Interface"—Published Date: Jul. 13, 2009 http://msdn.microsoft.com/en-us/library/dd371831(VS.85).aspx.  
"Building Blocks of Windows Animation"—Published Date: Jul. 13, 2009 http://msdn.microsoft.com/en-us/library/dd756723(VS.85).aspx.  
"Windows Animation API Overview"—Published Date: Jul. 13, 2009 http://msdn.microsoft.com/en-us/library/dd317017(VS.85).aspx.  
"About Timers"—Published Date: 2009 http://msdn.microsoft.com/en-us/library/ms644900(VS.85).aspx.

* cited by examiner

*Primary Examiner* — Aaron M Richer  
*Assistant Examiner* — Weiming He  
(74) *Attorney, Agent, or Firm* — Microsoft Corporation

(57) ABSTRACT

Many computer applications incorporate and support animation (e.g., interactive user interfaces). Unfortunately, it may be challenging for computer applications and rendering systems to render animation frames at a smooth and consistent rate while conserving system resources. Accordingly, a technique for controlling animation rendering frame rate of an application is disclosed herein. An animation rendering update interval of an animation timer may be adjusted based upon a rendering system state (e.g., a rate of compositing visual layouts from animation frames) of a rendering system and/or an application state (e.g., a rate at which an application renders frames) of an application. Adjusting the animation rendering update interval allows the animation timer to adjust the frequency of performing rendering callback notifications (work requests to an application to render animation frames) to an application based upon rendering system performance and application performance.

20 Claims, 10 Drawing Sheets

CONTROLLING ANIMATION FRAME RATE OF APPLICATIONS

BACKGROUND

Many user interfaces and computer applications incorporate animation to provide a robust user experience. However, animating objects may be stressful on computing systems, which may cause slowdowns and jerky animation due to over consumption of system resources (e.g., a rendering system and/or an application may be overburdened due to a lack of available resources needed to produce smooth rendering of animation frames). In order to balance a smooth consistent frame rate, current application programmer interfaces (APIs) may provide timing mechanisms that notify an application when it is time to render an animation frame. Unfortunately, current APIs may not take into account overall rendering system performance, application performance, and other system environmental factors when deciding how frequently to notify the application.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for controlling animation rendering frame rate of an application is disclosed herein. An animation timer may be configured to notify an application to render animation frames based upon an animation rendering update interval. That is, the animation timer may be configured to perform a rendering callback instruction to the application (e.g., a notification to the application that it is time to render an animation frame) upon lapse of the animation rendering update interval (e.g., a "tick" of the animation timer). It may be appreciated that the animation timer may be configured to operate over a period of time spanning multiple animation rendering update intervals. Thus, the animation timer may perform multiple rendering callback instructions to the application to produce a sequence of animation frames that a rendering system may display over time as an animation on a monitor.

The animation timer takes into account a rendering system state, an application state, and/or a computing environment state when determining and adjusting the animation rendering update interval. It may be appreciated that the animation rendering update interval may be a time period that the animation timer waits between sending notifications to the application of when it is time for the application to render an animation frame. The animation rendering update interval associated with the application may be adjusted based upon performance of the rendering system (e.g., composition rate of rendered animation frames into visual layouts), performance of the application (e.g., actual frame rendering rate), and/or other computer environment factors (e.g., is battery or A/C used for power).

In one example, if the rendering system is overstressed (e.g., a drop in frame rate is detected), then the animation rendering update interval may be increased to reduce the frequency of rendering callback instructions to the application, thus slowing down the rate at which the application creates and sends rendered animation frames to the rendering system, which may reduce stress on the rendering system. In another example, if the application is overstressed (e.g., the application is creating frames slower than excepted), then the animation rendering update interval may be increased to reduce the frequency of rendering callback instructions to the application, thus reducing the stress placed upon the application by the rendering callback instructions of the animation timer. In yet another example, the animation timer may notify the application that it is rendering animation frames slower than a minimum acceptable frame rate and may instruct the application to reduce its current rendering load (e.g., the application reduces the amount of drawing on the frame). It may be appreciated that the animation timer may also decide whether to temporarily shut off animation until the application and/or the rendering system are less burdened and capable of efficiently handling the rendering tasks.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
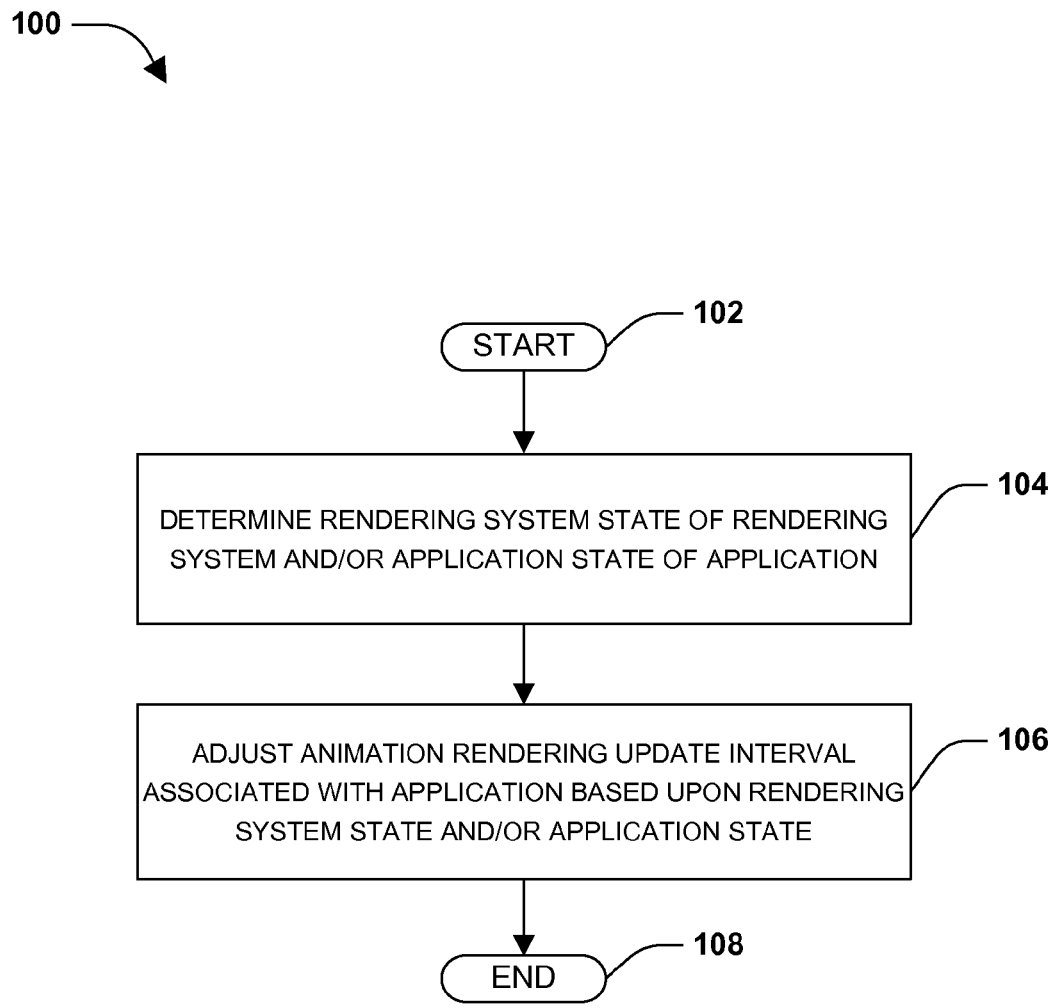
FIG. 1 is a flow chart illustrating an exemplary method of controlling animation rendering frame rate of an application.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many application program interfaces (APIs) utilize animation timing mechanisms to facilitate animation of objects. An animation timer may be implemented along with one or more applications and rendering systems to accomplish animation. For example, one or more applications may initialize an animation timer to provide notifications of when the respective applications are to render animation frames (e.g., frames for a user interface). Upon notification (e.g., a rendering callback instruction) from the animation timer, one or more applications may generate a rendered animation frame. A rendering system may capture the rendered animation frames and store them within one or more buffers associated with the one or more applications. The rendering system may composite together rendered animation frames from the one or more buffers into a visual layout and output the visual layout to a display device. For example, a rendering system may composite a first rendered frame of a first application and a second rendered frame of a second application to generate a visual layout. The rendering system may arrange a portion of the first rendered frame behind a portion of the second rendered frame because the second application is in the foreground, while the first application is in the background.

When animating objects, it may be challenging to provide animations that are rendered at a frame rate that is smooth and consistent. It may also be difficult to mitigate burdensome consumption of system resources used for rendering while the system is already busy. In one example, a rendering system may experience slow down (e.g., a drop in composition rate) due to a lack of system resources. In another example, an application may experience slow down (e.g., a decrease in frame rate per second—fps) due to, for example, rendering of complex and detailed frames. Current animation timers do not take into account various factors when determining how frequently the animation timer notifies the application to create a rendered animation frame. For example, an application may experience significant slowdown during execution, yet many animation timers may continue at a burdensome rate to notify the application to create rendered animation frames (e.g., the application is already overburdened, yet the animation timer continuously overloads the application with requests to perform additional work to render animation frames), thus increasing the likelihood of slow and/or jerky animation.

Accordingly, one or more techniques and/or systems for controlling animation rendering frame rate of an application is provided herein. An animation timer may be configured to take into account rendering system performance (e.g., composition rate), application performance (e.g., actual frame rendering rate), and/or other computer environment factors (e.g., is battery or A/C power currently used) when determining an animation rendering update interval (e.g., a time period the animation timer waits before performing a rendering callback instruction to notify the application of when it is time to render an animation frame). This allows the animation timer to increase and/or decrease the frequency of performing rendering callback instructions based upon performance of the rendering system, the application, and/or other computer environment factors. This allows the animation timer to fine tune how often the application is notified to render animation frames, thus increasing or decreasing the stress placed upon the application and/or the rendering system.

One embodiment of controlling animation rendering frame rate of an application is illustrated by an exemplary method 100 in FIG. 1. At 102, the method begins. At 104, a rendering system state of a rendering system and/or an application state of an application are determined. The rendering system state, for example, may be determined based upon a composition rate of the rendering system (e.g., a rate at which visual layouts are created from one or more rendered animation frames stored in one or more buffers associated with particular applications). The application state, for example, may be determined based upon an average frame rate at which the application is rendering. It may be appreciated that additional factors, such as a computer environment state may be taken into account (e.g., a computer power supply setting, a hardware component state—utilization of various hardware based timers, a multimedia component state—utilization of various multimedia timers, etc.).

At 106, an animation rendering update interval associated with the application may be adjusted based upon the rendering system state and/or the application state. In one example, the animation rendering update interval may be increased because of a performance slowdown of the rendering system as indicated by the rendering system state and/or because of a performance slowdown of the application as indicated by the application state. Increasing the animation rendering update interval decreases the frequency at which rendering callback instructions are performed, thus reducing the load upon the application (e.g., the application is not overloaded with notifications to render animation frames) and/or reducing the load upon the rendering system (e.g., the application creates and sends rendered animation frames to the rendering system less frequently). If the rendering system state indicates undesirable composition rate, then there is no point for the application to render animation frames faster than the rendering system is compositing the rendered animation frames (e.g., frames may be skipped because of the slower frame rendering rate of the rendering system).

In another example, the animation rendering update interval may be decreased to increase the frequency of rendering callback instructions because additional resources and/or processing power may be available within the rendering system as indicated by the rendering system state and/or the application as indicated by the application state. Decreasing the animation rendering update interval increases the frequency at which rendering callback instructions are performed (e.g., the animation timer waits shorter periods of time between performing rendering call back instructions), thus increasing animation performance by instructing the application to render animation frames at a higher frequency. At 108, the method ends.

It may be appreciated, that a rendering callback instruction may be performed when the animation rendering update interval lapses. The rendering callback instruction may instruct the application to render an animation frame. The rendered animation frame may be stored in a buffer. The rendering system may composite together rendered animation frames from one or more buffers to create a visual layout.

Figure 2:
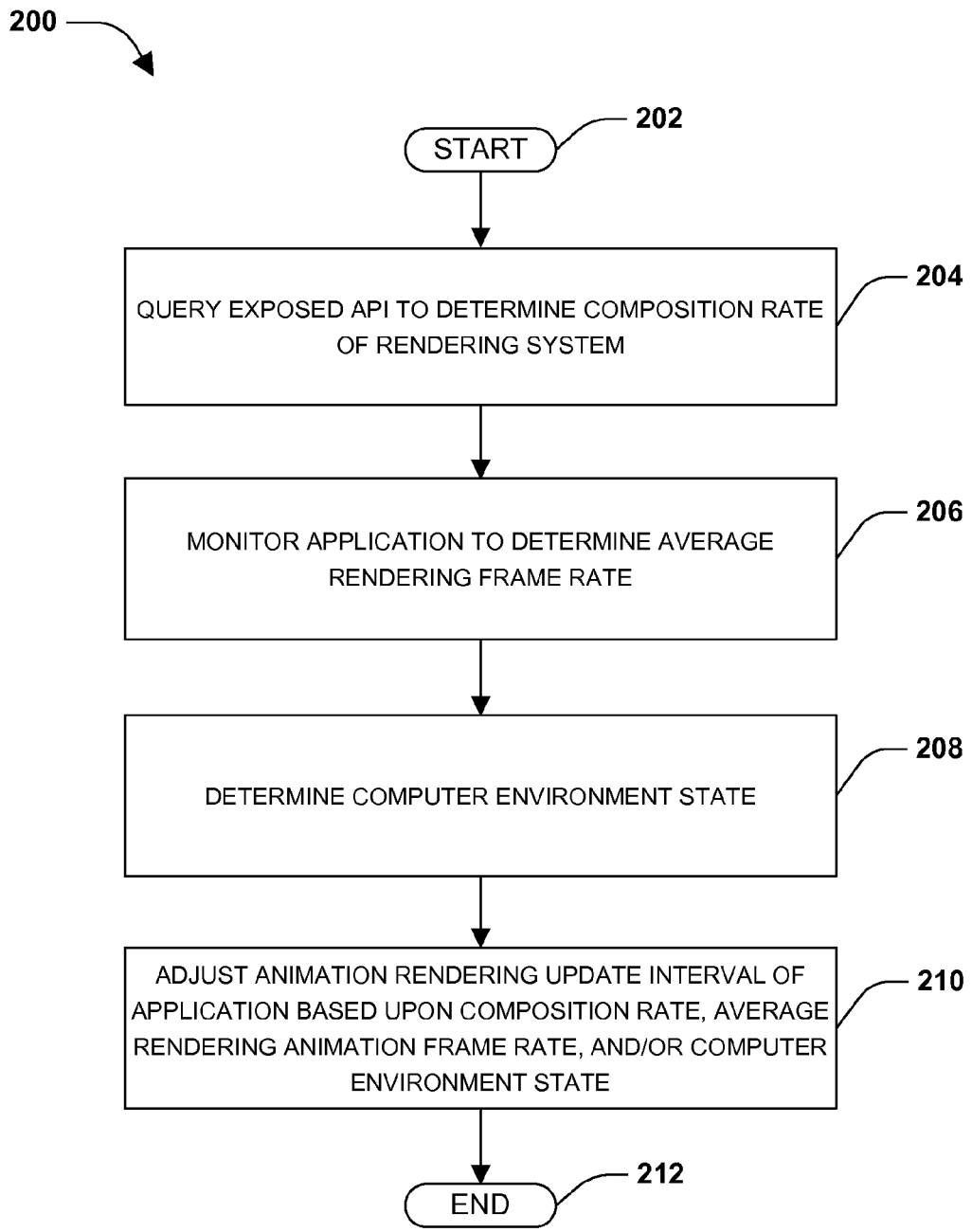
FIG. 2 is a flow chart illustrating an exemplary method of controlling animation rendering frame rate of an application.

A second embodiment of controlling animation rendering frame rate of an application is illustrated by an exemplary method 200 in FIG. 2. At 202, the method begins. At 204, an exposed API is queried to determine a composition rate of a rendering system. For example, the rendering system may expose a service from which a composition rate of the rendering system may be determined. At 206, an application may be monitored to determine an average rendering animation frame rate. At 208, a computer environment state may be determined. For example, the computer environment state may be based upon whether a computing environment executing the rendering system and the application is utilizing battery or A/C power. This may indicate whether the computing environment may have additional computing power available for rendering animation frames at a higher rate. Additionally, the computer environment state may be based upon whether other multimedia and/or hardware functionality and/or timers are available to facilitate animation frame rate rendering.

At 210, an animation rendering update interval of the application may be adjusted based upon the composition rate, the average rendering frame rate, and/or the computer environment state. For example, the animation rendering update interval may be increased or decreased to adjust the frequency at which rendering callback instructions are performed, thus dynamically adjusting the rendering load upon the application and/or the rendering system to improve animation (e.g., create a smoother animation experience for users) based upon the rendering system, the application, and/or the computer environment performance.

Figure 3:
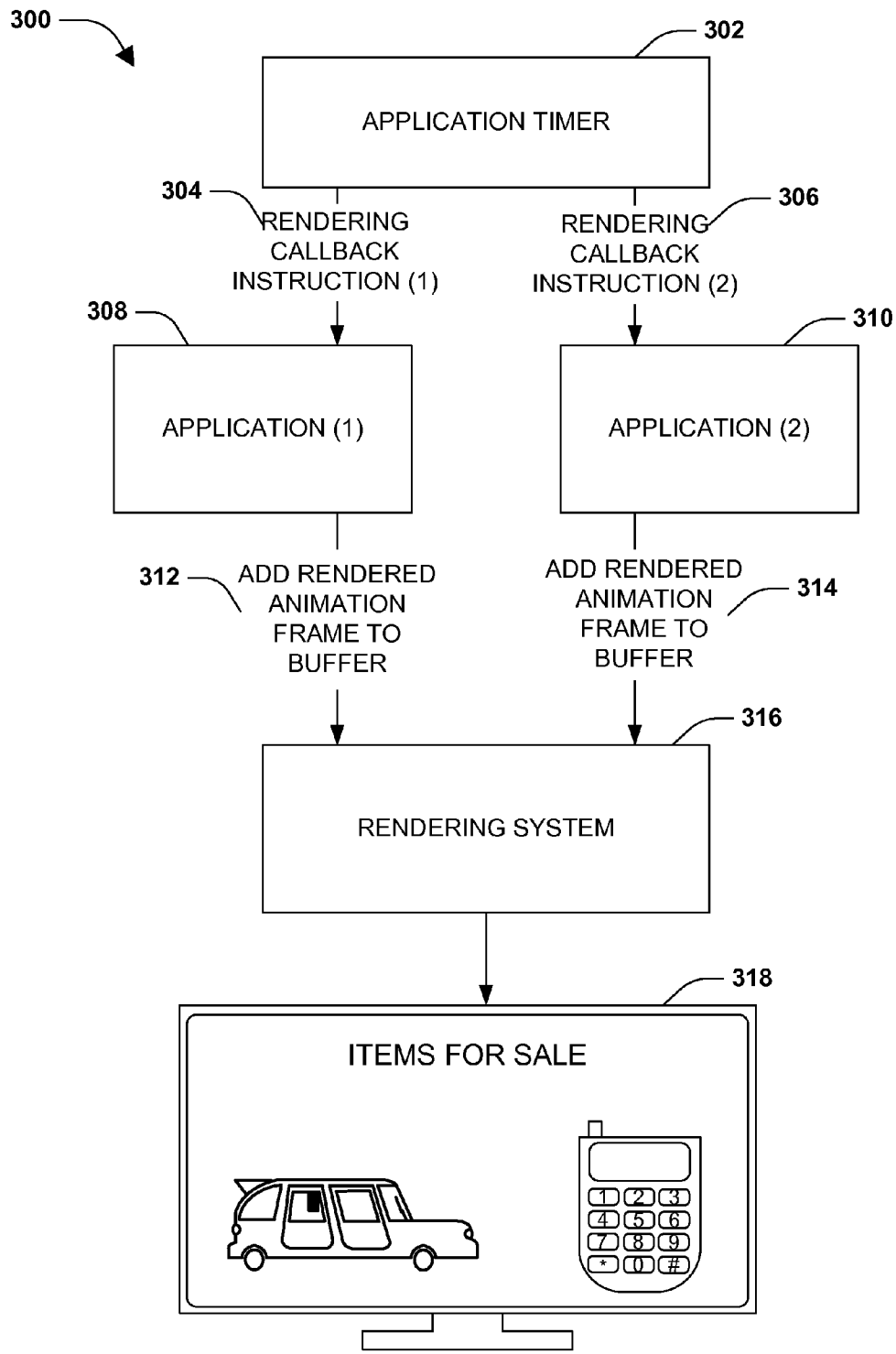
FIG. 3 is a component block diagram illustrating an exemplary system for controlling animation rendering frame rate of an application.

FIG. 3 illustrates an example of a system 300 configured to control animation rendering frame rate of an application. The system 300 comprises an application timer 302, an application (1) 308, an application (2) 310, a rendering system 316, and a monitor 318. The application timer 302 may be configured to notify applications (e.g., the application (1) 308 and the application (2) 310) when it is time to render an animation frame. For example, the animation timer 302 may be configured to perform a render callback instruction (1) 304 when an animation rendering update interval associated with application (1) 308 lapses. The animation timer 302 may be configured to perform a render callback instruction (2) 306 when an animation rendering update interval associated with application (2) 310 lapses. It may be appreciated that the application timer 302 is not limited to performing rendering callback instructions to two applications as depicted in the illustrated example, but may be configured to support many applications. The animation timer 302 may be configured to perform the exemplary method 100 and/or the exemplary method 200 to adjust animation rendering update intervals associated with the application (1) 308 and/or the application (2) 310.

Application (1) 308 may be notified by the rendering system 316 with the rendering callback instruction (1) 304 to render an animation frame (e.g., a car image). The rendered animation frame may be added 312 to a buffer associated with application (1) 308. Application (2) 310 may be notified by the rendering system 316 with the rendering callback instruction (2) 306 to render an animation frame (e.g., a phone image and "Items for sale" text). The rendered animation frame may be added 314 to a buffer associated with application (2) 310. The rendering system 316 may be configured to read rendered animation frames (e.g., the added 312 rendered animation frame of application (1) 308 and the added 314 rendered animation frame of application (2) 310) from one or more buffers. The rendering system 316 may be configured to composite the rendered animation frames into a visual layout. For example, the phone car image frame may be composited with the phone image and "items for sale" frame to create a visual layout that may be displayed upon the monitor 318. It may be appreciated that the example system 300 of FIG. 3 is just one example of how a rendering system and an application may (inter)operate.

Figure 4:
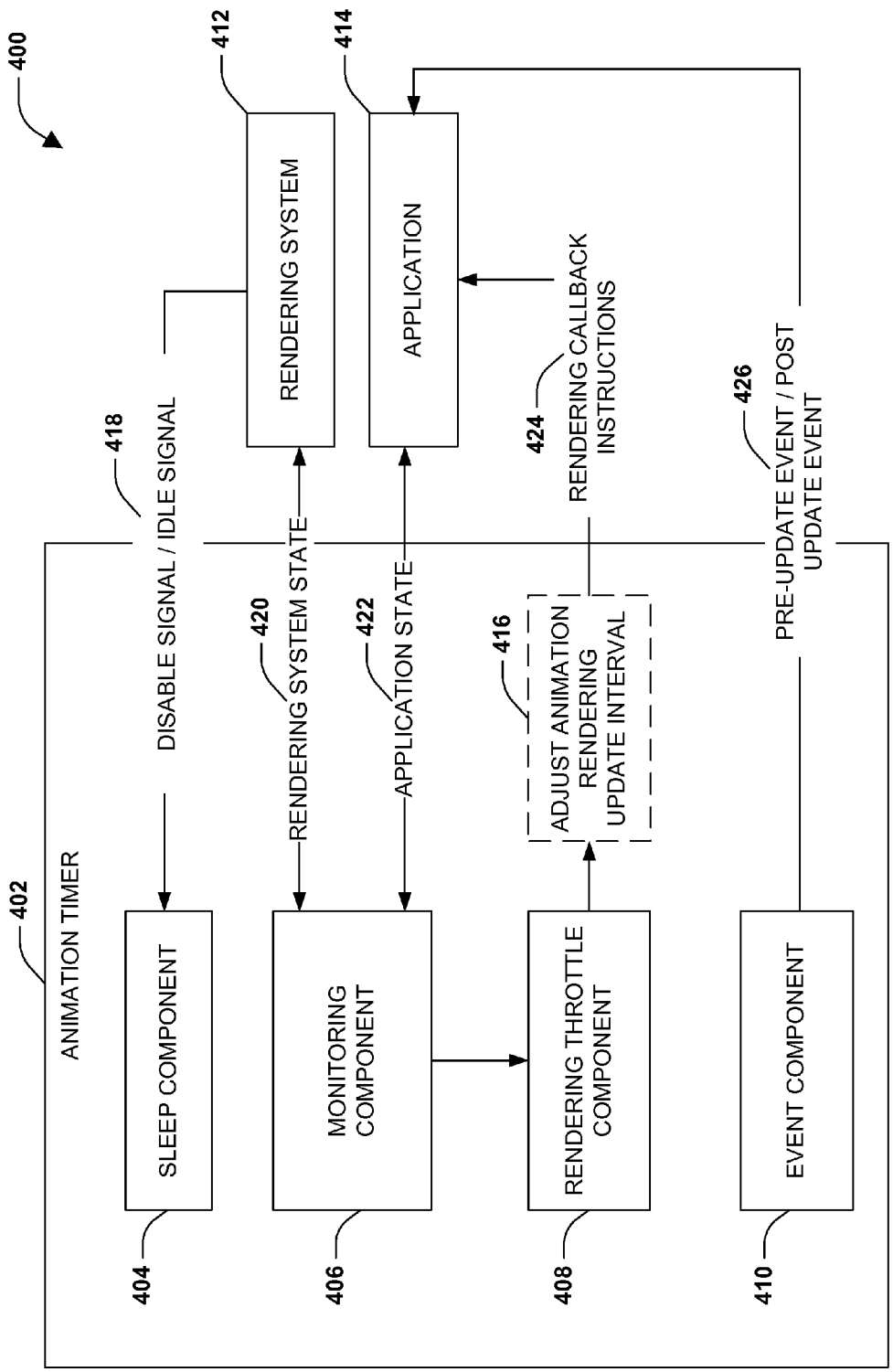
FIG. 4 is a component block diagram illustrating an exemplary system for controlling animation rendering frame rate of an application.

FIG. 4 illustrates an example of a system 400 configured to control animation rendering frame rate of an application 414. In one example, the application 414 may be configured to render animation frames based upon receiving rendering callback instructions from an animation timer 402. A rendering system 412 may be configured to receive rendered animation frames from one or more applications (e.g., extract rendered animation frames from buffers associated with the one or more applications). The rendering system 412 may composite together the rendered animation frames to create a visual layout which may be output to a display device.

The system 400 may comprise the animation timer 402 configured to control animation rendering frame rate of one or more applications (e.g., a first application, a second application, the application 414). The animation timer 402 may comprise a sleep component 404, a monitoring component 406, a rendering throttle component 408, and/or an event component 410. The monitoring component 406 may be configured to determine a rendering system state 420 of the rendering system 412 and/or an application state 422 of the application 414. The rendering system state 420, for example, may be a composition rate of the rendering system 412 (e.g., the rate at which the rendering system 412 composites rendered animation frames of applications into a visual layout). It may be appreciated that the rendering system state 420 may comprise factors other than the composition rate. For example, the rendering system state 420 may be based upon resource availability to rendering system, rendering system overall execution performance, rendering system load, and/or other factors associated with rendering system performance. The application state 422, for example, may be the rate at which the application 414 is rendering animation frames. It may be appreciated that the application state 422 may comprise other factors than the rendering animation frame rate. For example, other performance indicators of the application's execution state may be taken into account, such as, raw CPU usage (e.g. a spreadsheet calculating formulas it comprises whilst it animates a progress bar graphic), and/or I/O activity (e.g., network or disk data transfer).

The monitoring component 406 may also be configured to determine a computing environment state. The computing environment state may, for example, comprise a computer power supply setting, a hardware component state (e.g., do other hardware timers exist), a multimedia component state (e.g., do other multimedia timers exist), and/or other environmental factors that may affect animation rendering frame rate (e.g., existence of other resources that may be utilized in enhancing animation rendering frame rate). It may be appreciated that the rendering throttle component 408 may adjust an animation rendering update interval 416 based upon the computing environment state.

The rendering throttle component 408 may be configured to adjust the animation rendering update interval 416 based upon the rendering system state 420 and/or the application state 422. It may be appreciated that the animation rendering update interval 416 is a period of time in which the animation timer 402 waits between performing rendering callback instructions 424 (e.g., instructions notifying the application 414 that it is time to render an animation frame) to the application 414. In one example, the rendering throttle component 408 may increase the animation rendering update interval 416 to decrease a frequency of performing rendering callback instructions 424 to the application 414 based upon the rendering system state 420 and/or the application state 422. That is, if the performance of the rendering system 412 and/or the performance of the application 414 are below a desired threshold, then the rendering throttle component 408 may increase the time between notifications to the application 414 to render animation frames, thus reducing the load upon the application 414 and/or the rendering system 412.

In another example, the animation rendering update interval 416 may be decreased to increase a frequency of performing rendering callback instructions 424 to the application 414 based upon the rendering system state 420 and/or the application state 422. This allows the animation timer 402 to increase a frame rendering rate of the application 414 because, for example, the application 414 and/or the rendering system 412 have the performance capacity to handle the increased frame rendering rate.

The event component 410 may be configured to notify 426 the application 414 of a pre-update event opportunity before the animation timer 402 changes state and/or a post-update event opportunity after the animation timer 402 changes state (e.g., the animation rendering update interval expires whereupon the animation timer performs a rendering callback instruction, thus changing state). This allows the application 414 to perform pre-update and/or post-update processing, such as, setting bit flags, execute application specific code, trigger a particular layout based upon a change occurring during the animation state change.

The sleep component 404 may be configured to receive a disable signal and/or idle signal 418 from the rendering system 412. The sleep component 404 may instruct the animation timer 402 to enter a sleep mode until receiving a wakeup signal from the application 414. This allows resources to be conserved because the animation timer 402 may enter a sleep mode when the application is not rendering animation frames, for example.

It may be appreciated that the animation timer 402 may be abstracted from the rendering system 412 and/or the application 414 (e.g., a stand alone platformized component providing an interface to interact with a variety of clients), thus allowing various clients to utilize the animation timer 402. It may be appreciated that the animation timer 402 may be configured to adjust its own operation in order to increase overall computing system efficiency. In one example, resource usage of the animation timer 402 may be adjusted based upon available system resources (e.g., increase or decrease resource utilization and processing, utilize alternative system resources). In another example, the precision of the animation timer may be adjusted based upon the application state 422 (e.g., a less precise timing technique may be utilized for applications that do not care about high precision timing).

Figure 5:
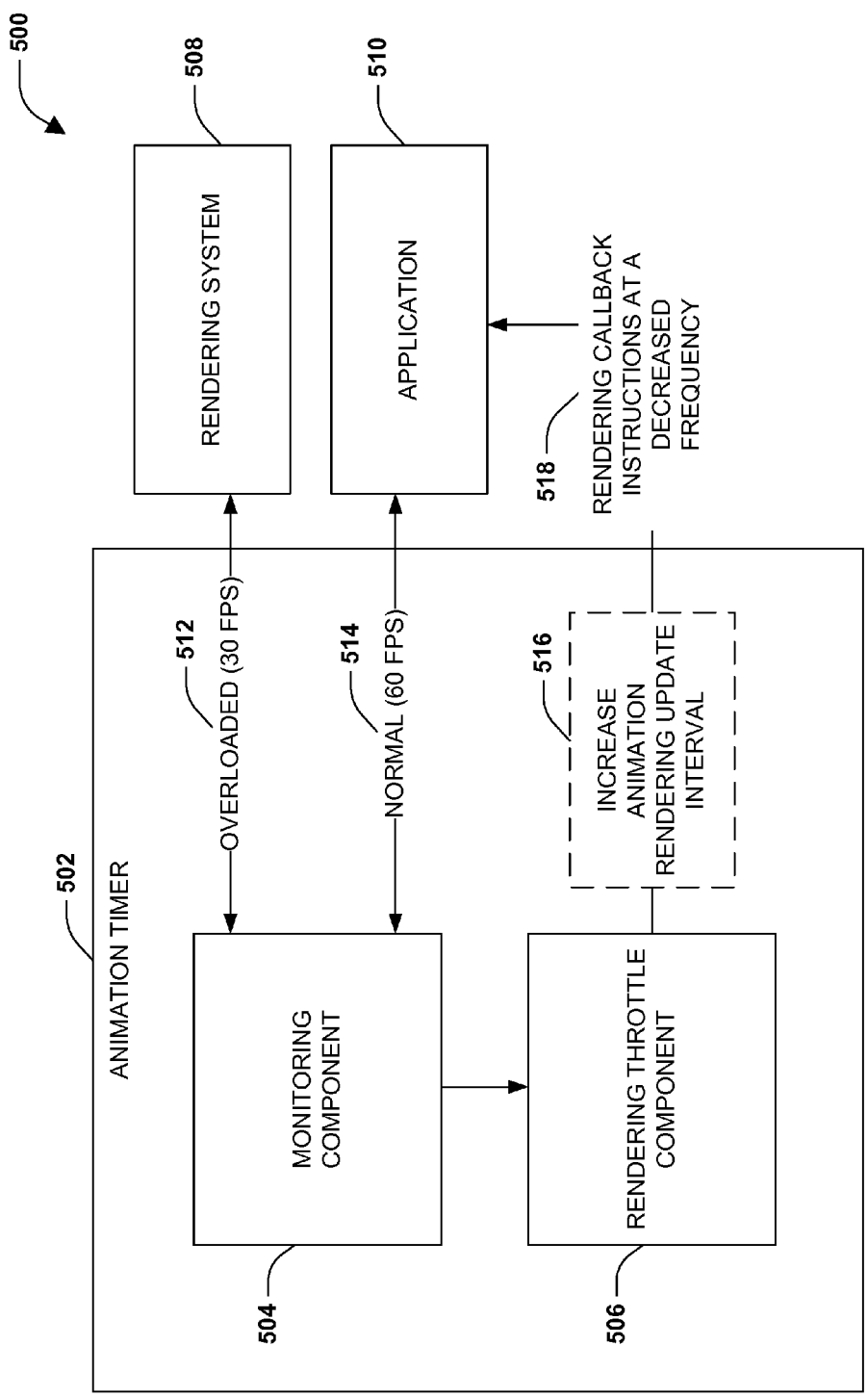
FIG. 5 is an illustration of an example of an animation timer increasing an animation rendering update interval based upon overload of a rendering system.

FIG. 5 illustrates an example of an animation timer 502 increasing an animation rendering update interval 516 based upon overload of a rendering system 508. The animation timer 502 may comprise a monitoring component 504 and/or a rendering throttle component 506. The monitoring component 504 may be configured to determine a rendering system state (e.g., an overloaded rendering system state 512 at 30 fps) and an application state (e.g., a normal application state 514 at 60 fps). The rendering throttle component 506 may be configured to adjust an animation rendering update interval 516 based upon the rendering system state and/or the application state. It may be appreciated that the animation rendering update interval 516 is a period of time in which the animation timer 502 waits between performing rendering callback instructions 518 (e.g., instructions notifying the application 510 when it is time to render an animation frame) to the application 510.

In one example, the monitoring component 504 may determine that the application 510 is rendering animation frames at 60 fps, the normal application state 514. The monitoring component 504 may determine that the rendering system 508 has a compositing rate of 30 fps, the overloaded rendering system state 512, which indicates that the rendering system's performance may be below a desired performance level due to, for example, a lack of execution resources and/or an overload of work to perform.

The rendering throttle component 506 may increase the animation rendering update interval 516 (e.g., increasing the time the animation timer 502 waits between notifying the application 510 to render an animation frame), which decreases a frequency at which rendering callback instructions to the application are performed. The decrease in frequency of performing rendering callback instructions 516 in effect decreases the rate at which the application 510 generates animation frames for the rendering system, thus decreasing the load upon the rendering system 508 because of the slow down of new animation frames to composite into a visual layout. If the rendering throttle component 506 did not slow down the rate at which the application 510 rendered new animation frames, many animation frames (e.g., every other animation frame) may be lost due to the overloaded rendering system compositing visual layouts at half the rate the application was rendering animation frames, thus producing a less than desirable visual experience for a user.

Figure 6:
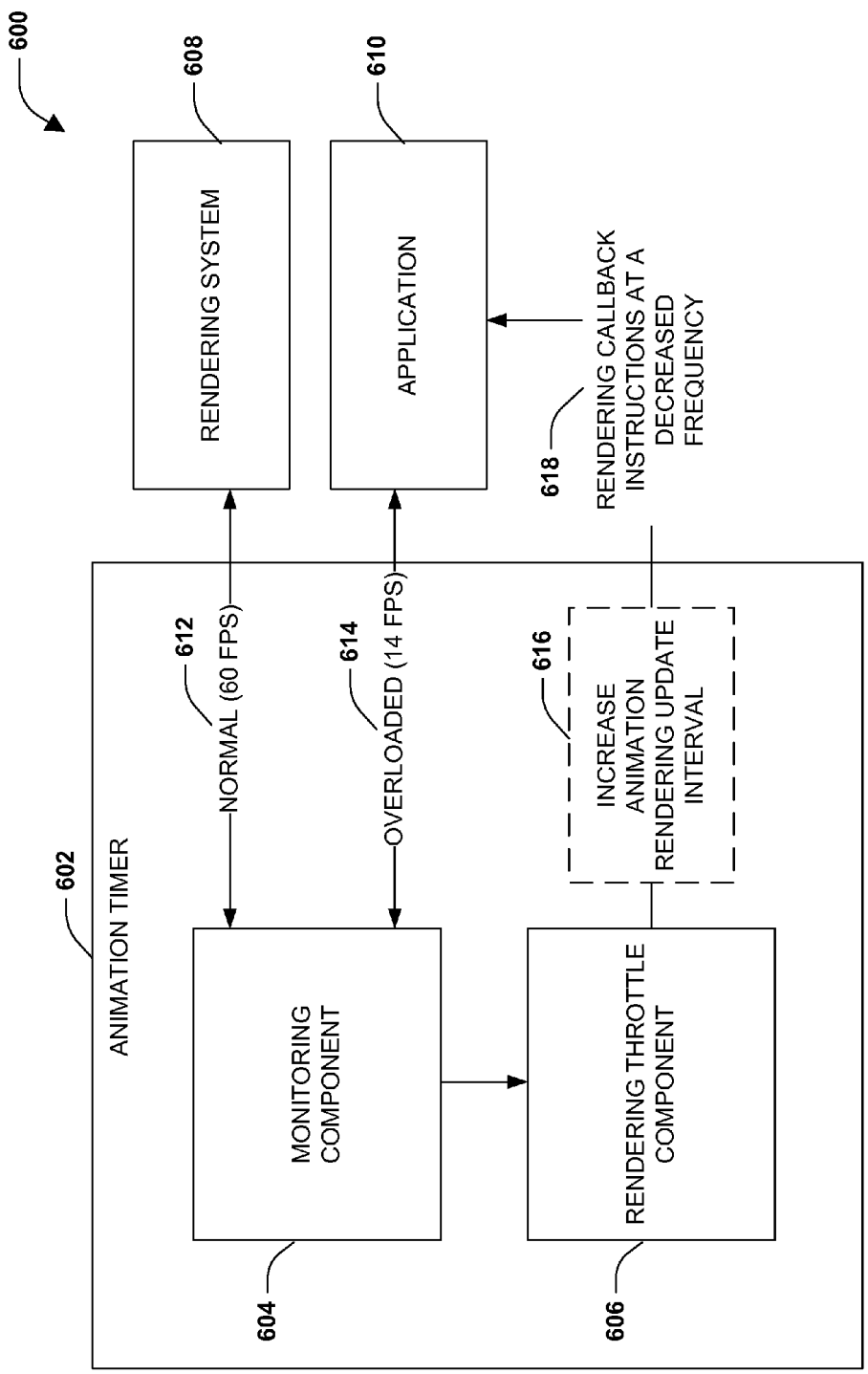
FIG. 6 is an illustration of an example of an animation timer increasing an animation rendering update interval based upon overload of an application.

FIG. 6 illustrates an example of an animation timer 602 increasing an animation rendering update interval 616 based upon overload of an application 610. The animation timer 602 may comprise a monitoring component 604 and/or a rendering throttle component 606. The monitoring component 604 may be configured to determine a rendering system state (e.g., a normal rendering system state 612 at 60 fps) and an application state (e.g., an overloaded application state 614 at 14 fps). The rendering throttle component 606 may be configured to adjust an animation rendering update interval 616 based upon the rendering system state and/or the application state. It may be appreciated that the animation rendering update interval 616 is a period of time in which the animation timer 602 waits between performing rendering callback instructions 618 (e.g., instructions notifying the application 610 to render an animation frame) to the application 610.

In one example, the monitoring component 604 may determine that the application 610 is rendering animation frames at 14 fps, the overloaded application state 614, thus indicating the application's performance may be below a desired level due to, for example, a lack of execution resources and/or an overload of work to perform. The monitoring component 604 may determine that the rendering system 608 has a compositing rate of 60 fps, the normal rendering system state 612. Because the application state is overloaded, the rendering throttle component 606 may increase the animation rendering update interval 616 (e.g., increasing the time the animation timer 602 waits between notifying the application 610 to render an animation frame), which decreases a frequency at which rendering callback instructions to the application 610 are performed. Decreasing the frequency of performing rendering callback instructions 616 may reduce the burden placed upon the application 610 because the animation timer 602 requests the application 610 to render animation frames less frequently (e.g., decrease the amount of requests to the application to perform rendering work).

Figure 7:
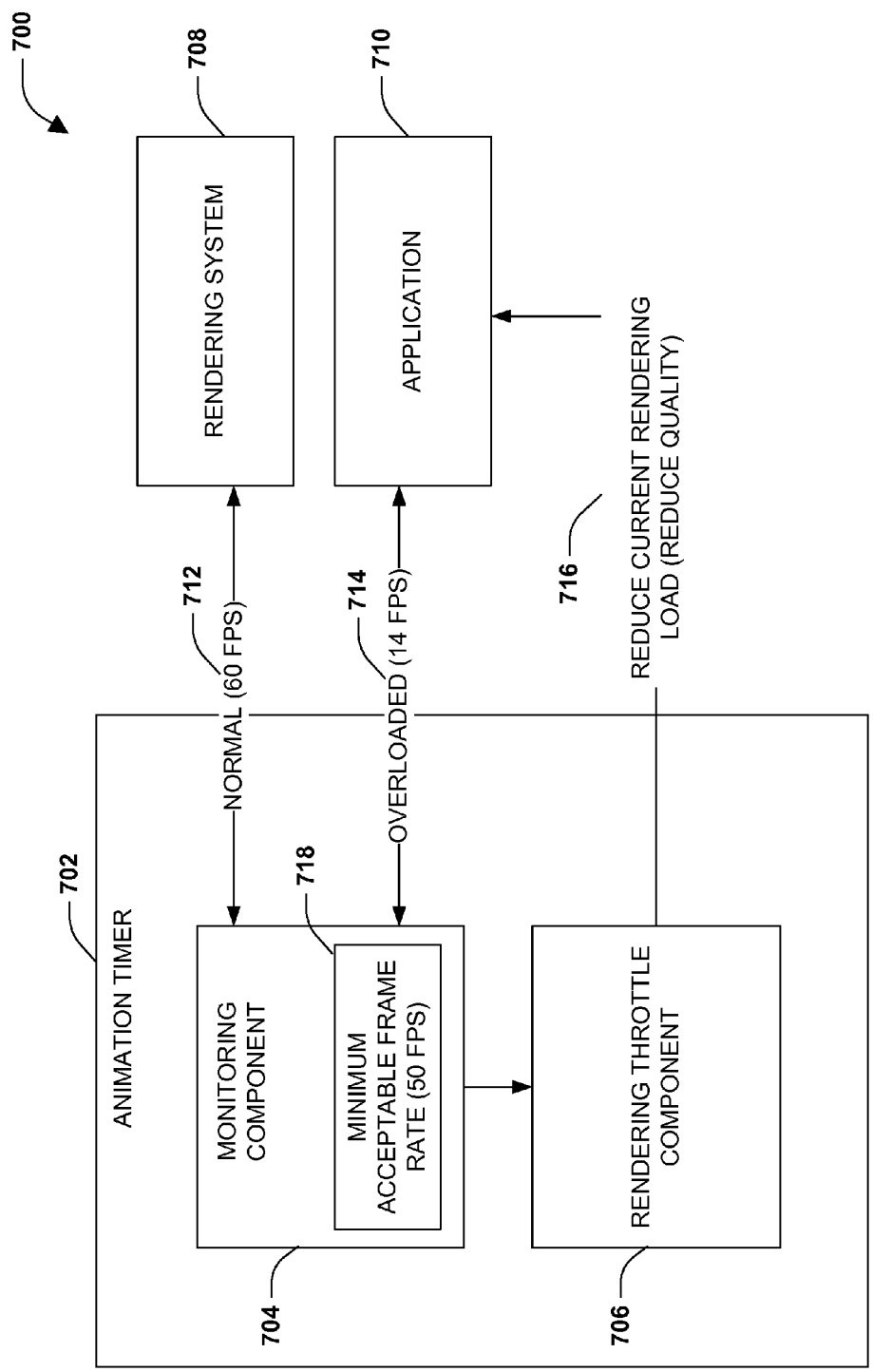
FIG. 7 is an illustration of an example of an animation timer notifying an application to reduce a current rendering load.

FIG. 7 illustrates an example of an animation timer 702 notifying 716 an application 710 to reduce a current rendering load. The animation timer 702 may comprise a monitoring component 704 and/or a rendering throttle component 706. The monitoring component 704 may be configured to determine a rendering system state (e.g., a normal rendering system state 712 at 60 fps) of a rendering system 708 and an application state (e.g., an overloaded application state 714 at 14 fps) of the application 710. The monitoring component 704 may be configured to determine whether an application rendering rate, for example as indicated by the application state, falls below a minimum acceptable frame rate 718 at 50 fps. The minimum acceptable frame rate 718 may designate a minimum desirable frame rate at which the application 710 may render animation frames. The rendering throttle component 706 may be configured to notify the application to reduce a current rendering load 716 if the application rendering rate falls below the minimum acceptable frame rate 718.

In one example, the monitoring component 704 may determine the overloaded application state 714 of the application 710. The monitoring component 704 may derive an application rendering rate based upon the overloaded application state 714. The monitoring component 704 may compare the application rendering rate with the minimum acceptable frame rate 718 to determine whether the application rendering rate falls below the minimum acceptable frame rate 718. If the application rendering rate falls below the minimum acceptable frame rate 718, then the rendering throttle component 706 may notify the application 710 to reduce the current rendering load 716. For example, the application 710 may be rendering animation frames comprising large amount of rendering data. The rendering throttle component 706 may notify the application to reduce the quality of the rendering animation frames to increase the animation rendering rate (e.g., a lower quality animation frame may take less time to generate than a higher quality animation frame, thus increasing the animation rendering rate).

Figure 8:
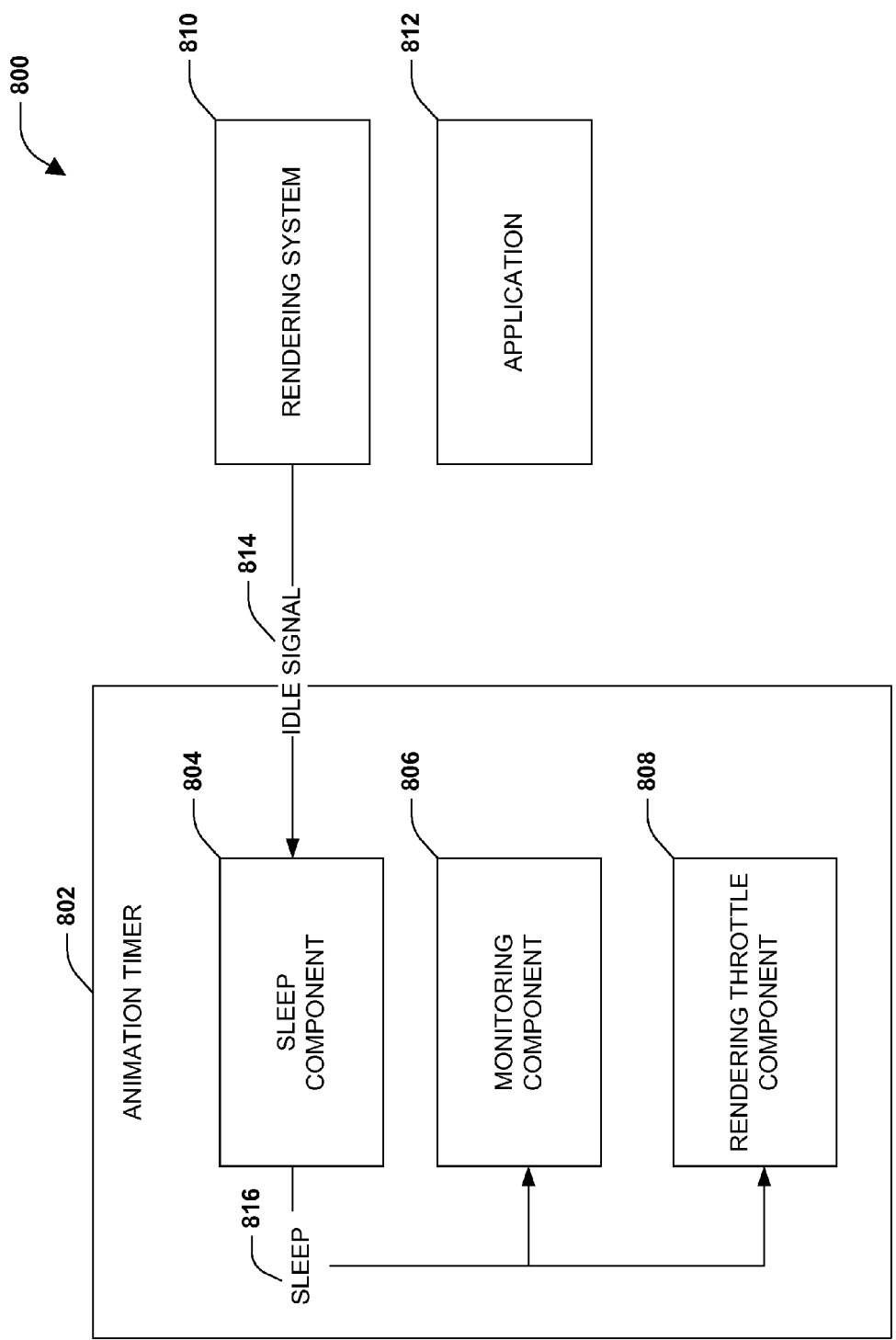
FIG. 8 is an illustration of an example of an animation timer entering a sleep mode to conserve computing system resources.

FIG. 8 illustrates an example of an animation timer 802 entering a sleep mode to conserve computing system resources. The animation timer 802 may comprise a sleep component 804, a monitoring component 806, and/or a rendering throttle component 808. The sleep component 804 may be configured to receive a disable and/or idle signal 814 from a rendering system 810. For example, the rendering system 810 may send the disable and/or idle signal 814 to the sleep component 804 because an application 812 associated with the animation timer 802 may not currently have frames to render and/or because the rendering system 810 is too busy to currently process rendered frame data from the application 812. The sleep component 804 may be configured to instruct 816 the animation timer 802 to enter a sleep mode until receiving a wakeup signal from the application 812 (e.g., the application is ready to render new animation frames).

Figure 9:
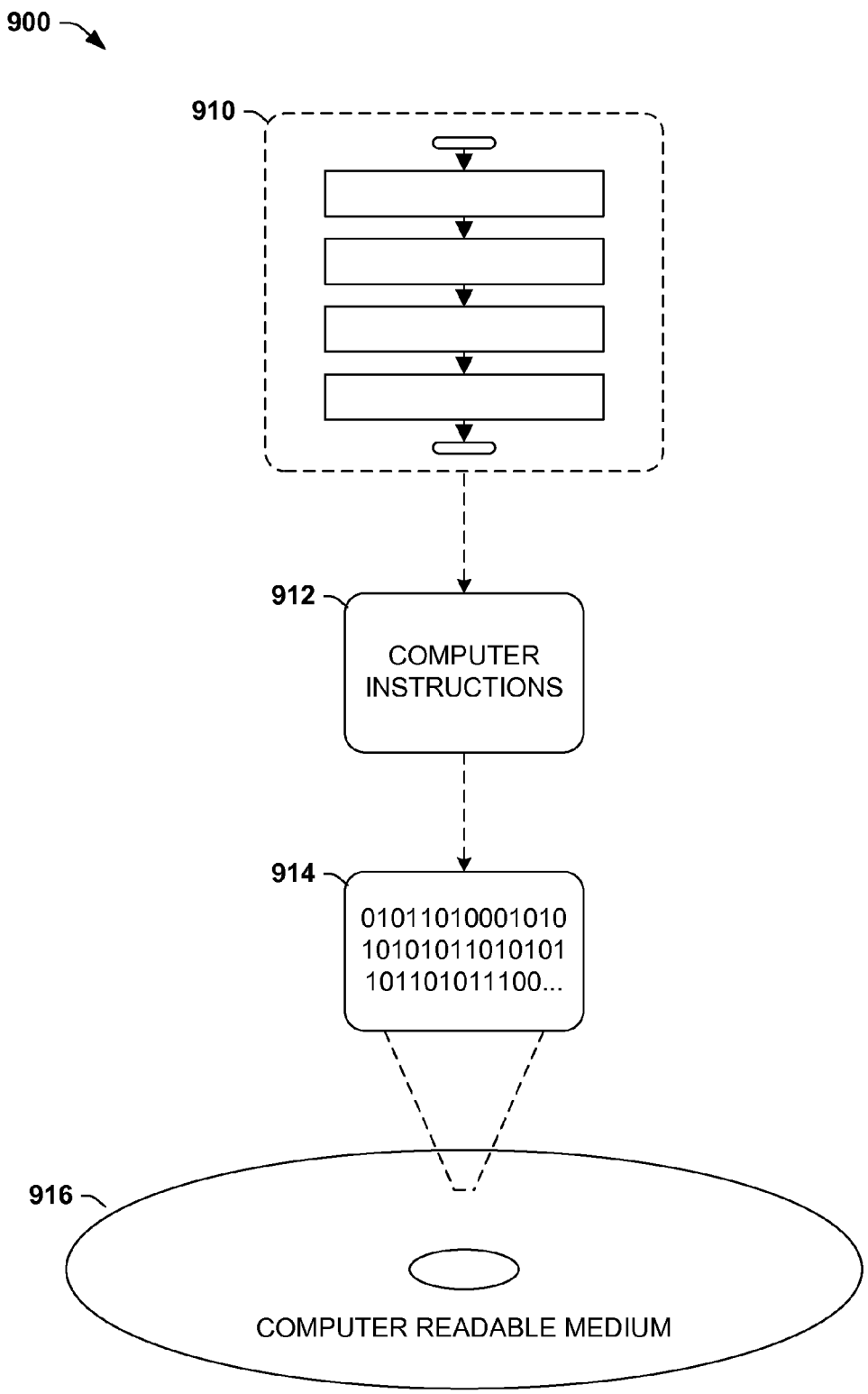
FIG. 9 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 916 (e.g., a CD-R, DVD-R, or a platter of a hard disk drive), on which is encoded computer-readable data 914. This computer-readable data 914 in turn comprises a set of computer instructions 912 configured to operate according to one or more of the principles set forth herein. In one such embodiment 900, the processor-executable instructions 912 may be configured to perform a method 910, such as the exemplary method 100 of FIG. 1 and/or the exemplary method 200 of FIG. 2, for example. That is, the processor-executable instructions 912 may implement the exemplary methods 100 and/or 200 as an application program interface (API) which may be executed via one or more processors. In another such embodiment, the processor-executable instructions 912 may be configured to implement a system, such as the exemplary system 300 of FIG. 3 and/or the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
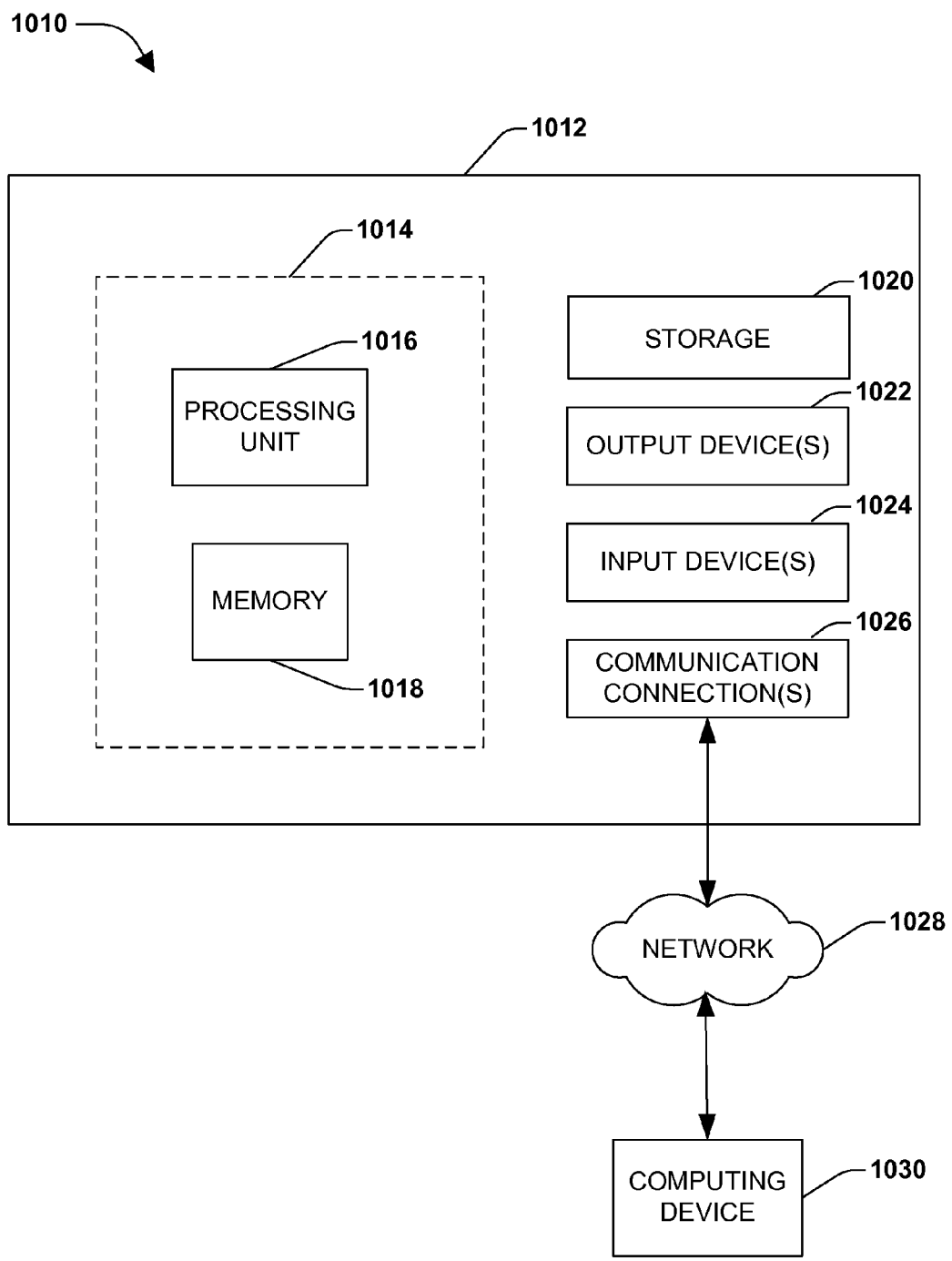
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for controlling an animation rendering frame rate of an application comprising:

determining a rendering system state of a rendering system, the rendering system state comprising a composite rate at which the rendering system composites rendered animation frames of one or more applications into a visual layout for display;

determining an application state of at least one application of the one or more applications, the application state based upon:
an animation rendering frame rate determined based upon an average frame rate at which the at least one application is rendering;
raw CPU usage associated with the at least one application; and
I/O activity associated with the at least one application;

determining a computer environment state of a computer running at least some of the one or more applications based upon:
a power supply setting of the computer indicative of a use of at least one of a battery or A/C power, the power supply setting indicative of whether the computer has additional computing power available for rendering animation frames at a rate greater than the animation rendering frame rate;
a hardware component state based upon whether one or more hardware based timers are available to facilitate animation frame rate rendering; and
a multimedia component state based upon whether one or more multimedia timers are available to facilitate animation frame rate rendering; and adjusting an animation rendering update interval associated with the at least one application based upon the rendering system state, the application state and the computer environment state, the animation rendering update interval associated with a time period to wait before performing a rendering callback instruction to notify the at least one application to render an animation frame, the adjusting comprising:
when the rendering system is determined to be overstressed based upon a determination that the composite rate has fallen below a composite threshold, increasing the animation rendering update interval;
when the at least one application is determined to be overstressed based upon a determination that the animation rendering frame rate has fallen below a threshold, at least one of:
increasing the animation rendering update interval; or
instructing the at least one application to reduce a current rendering load of the at least one application; and
increasing or decreasing the animation rendering update interval based upon the power supply setting, the hardware component state and the multimedia component state.

2. The method of claim 1, the rendering system configured to display one or more rendered animation frames on a monitor.

3. The method of claim 1, at least some of the method performed by an application program interface (API).

4. The method of claim 1, the I/O activity associated with network data transfer.

5. The method of claim 1, comprising:
decreasing the animation rendering update interval after increasing the animation rendering update interval.

6. The method of claim 1, the instructing the at least one application to reduce a current rendering load comprising:
notifying the at least one application to render one or more animation frames at a lower resolution.

7. The method of claim 1, comprising:
responsive to receiving at least one of a disable signal or an idle signal from the rendering system, entering a sleep mode until receiving a wakeup signal from an application of the one or more applications.

8. The method of claim 1, the adjusting performed by an animation timer.

9. The method of claim 8, comprising:
notifying an application of the one or more applications of a pre-update event opportunity before the animation timer changes state.

10. The method of claim 8, comprising:
notifying an application of the one or more applications of a post-update event opportunity after the animation timer changes state.

11. The method of claim 8, comprising:
adjusting at least one of:
a resource usage of the animation timer based upon available system resources; or
a precision of the animation timer based upon the application state.

12. A system, implemented at least in part via a processing unit, for controlling an animation rendering frame rate of an application, the system comprising:
an animation timer comprising:
a monitoring component configured to determine:
a rendering system state of a rendering system, the rendering system state comprising a composite rate at which the rendering system composites rendered animation frames of one or more applications into a visual layout for display;
an application state of at least one application of the one or more applications, the application state based upon:
an animation rendering frame rate determined based upon an average frame rate at which the at least one application is rendering;
raw CPU usage associated with the at least one application; and
I/O activity associated with the at least one application; and
a computer environment state of a computer running at least some of the one or more applications, the computer environment state determined based upon:
a power supply setting of the computer indicative of a use of at least one of a battery or A/C power, the power supply setting indicative of whether the computer has additional computing power available for rendering animation frames at a rate greater than the animation rendering frame rate;
a hardware component state based upon whether one or more hardware based timers are available to facilitate animation frame rate rendering; and
a multimedia component state based upon whether one or more multimedia timers are available to facilitate animation frame rate rendering; and
a component configured to:
adjust an animation rendering update interval associated with the at least one application based upon the rendering system state, the application state and the computer environment state, the animation rendering update interval associated with a time period to wait before performing a rendering callback instruction to notify the at least one application to render an animation frame.

13. The system of claim 12, comprising:
a sleep component configured to:
responsive to receiving at least one of a disable signal or an idle signal from the rendering system, instruct the animation timer to enter a sleep mode until receiving a wakeup signal from an application of the one or more applications.

14. The system of claim 12, comprising:
an event component configured to at least one of:
notify an application of the one or more applications of a pre-update event opportunity before the animation timer changes state; or
notify an application of the one or more applications of a post-update event opportunity after the animation timer changes state.

15. The system of claim 12, the rendering system configured to display one or more rendered animation frames on a monitor.

16. The system of claim 12, the animation timer configured to:
adjust at least one of:
a resource usage of the animation timer based upon available system resources; or
a precision of the animation timer based upon the application state.

17. The system of claim 12, the component configured to:
decrease the animation rendering update interval after increasing the animation rendering update interval.

18. The system of claim 12, the I/O activity associated with disk data transfer.

19. The system of claim 12, the animation timer configured to control respective animation rendering frame rates of a first application and a second application.

20. A computer readable storage device comprising instructions that when executed perform a method for controlling an animation rendering frame rate of an application, the method comprising:
determining a rendering system state of a rendering system, the rendering system state comprising a composite rate at which the rendering system composites rendered animation frames of one or more applications into a visual layout for display;
determining an application state of at least one application of the one or more applications, the application state based upon at least one of:
an animation rendering frame rate determined based upon an average frame rate at which the at least one application is rendering;
raw CPU usage associated with the at least one application; or
I/O activity associated with the at least one application;
determining a computer environment state of a computer running at least some of the one or more applications based upon at least one of:
a power supply setting of the computer indicative of a use of at least one of a battery or A/C power, the power supply setting indicative of whether the computer has additional computing power available for rendering animation frames at a rate greater than the animation rendering frame rate;
a hardware component state based upon whether one or more hardware based timers are available to facilitate animation frame rate rendering; or
a multimedia component state based upon whether one or more multimedia timers are available to facilitate animation frame rate rendering; and
adjusting an animation rendering update interval associated with the at least one application based upon at least one of the rendering system state, the application state or the computer environment state, the animation rendering update interval associated with a time period to wait before performing a rendering callback instruction to notify the at least one application to render an animation frame, the adjusting comprising at least one of:
when the rendering system is determined to be overstressed based upon a determination that the composite rate has fallen below a composite threshold, increasing the animation rendering update interval;
when the at least one application is determined to be overstressed based upon a determination that the animation rendering frame rate has fallen below a threshold, at least one of:
increasing the animation rendering update interval; or
instructing the at least one application to reduce a current rendering load of the at least one application; or
increasing or decreasing the animation rendering update interval based upon at least one of the power supply setting, the hardware component state or the multimedia component state.

* * * * *